Figure 1:
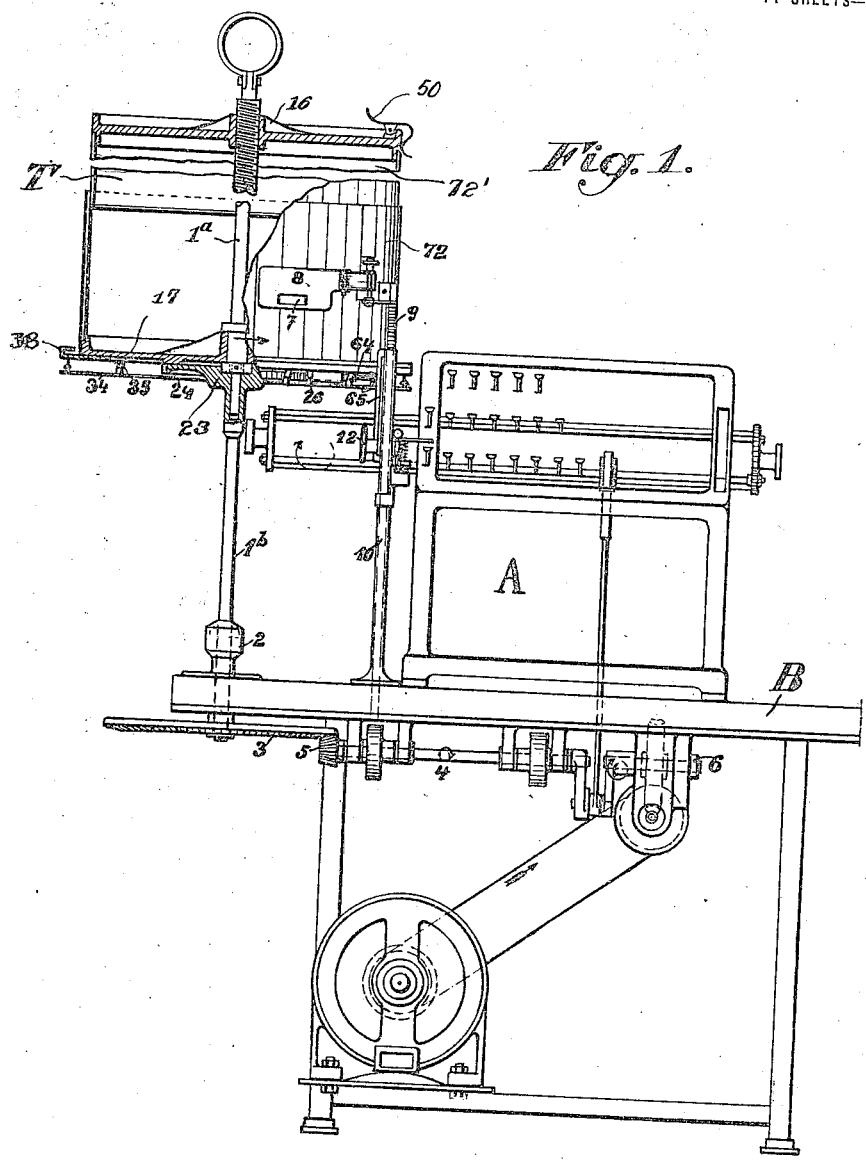

Mar. 6, 1923.
F. LUDWIG.
METHOD OF AND MEANS FOR USE IN CALCULATING WAGES.
FILED FEB. 28, 1921.

1,447,479.

11 SHEETS—SHEET 2.

Mar. 6, 1923.

F. LUDWIG.
METHOD OF AND MEANS FOR USE IN CALCULATING WAGES.
FILED FEB. 28, 1921.

1,447,479.

11 SHEETS—SHEET 3.

Inventor.
Ferdinand Ludwig.
By Henry Ooth Jr
Atty

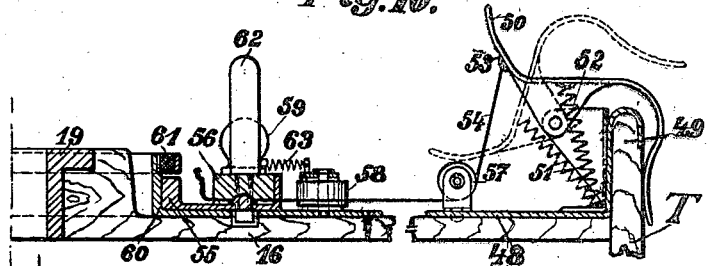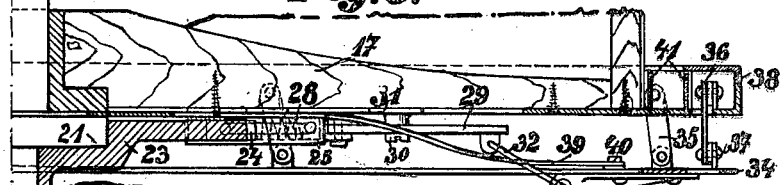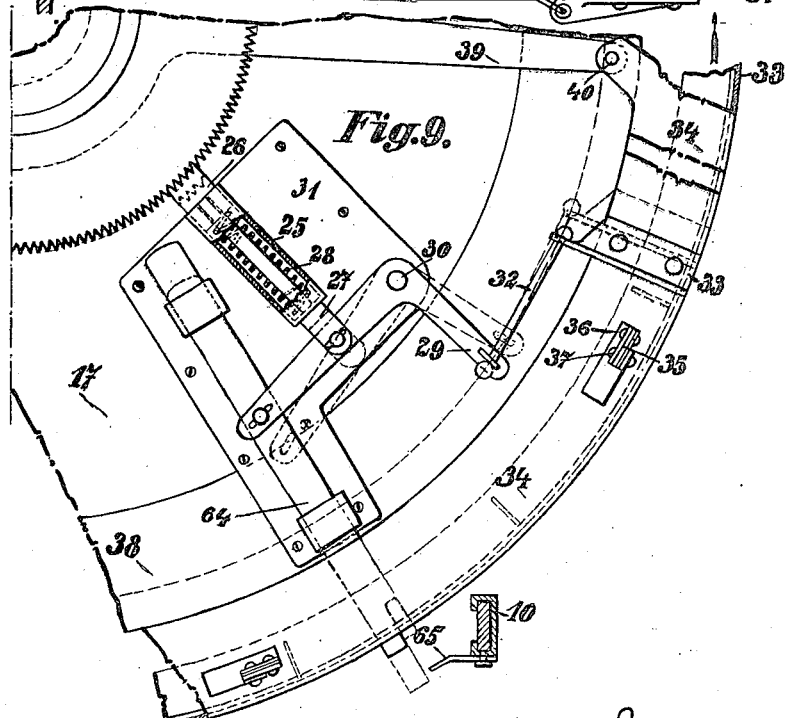

Inventor
Ferdinand Ludwig,
By
Atty.

Mar. 6, 1923.
F. LUDWIG.
METHOD OF AND MEANS FOR USE IN CALCULATING WAGES.
FILED FEB. 28, 1921.
1,447,479.
11 SHEETS—SHEET 7.
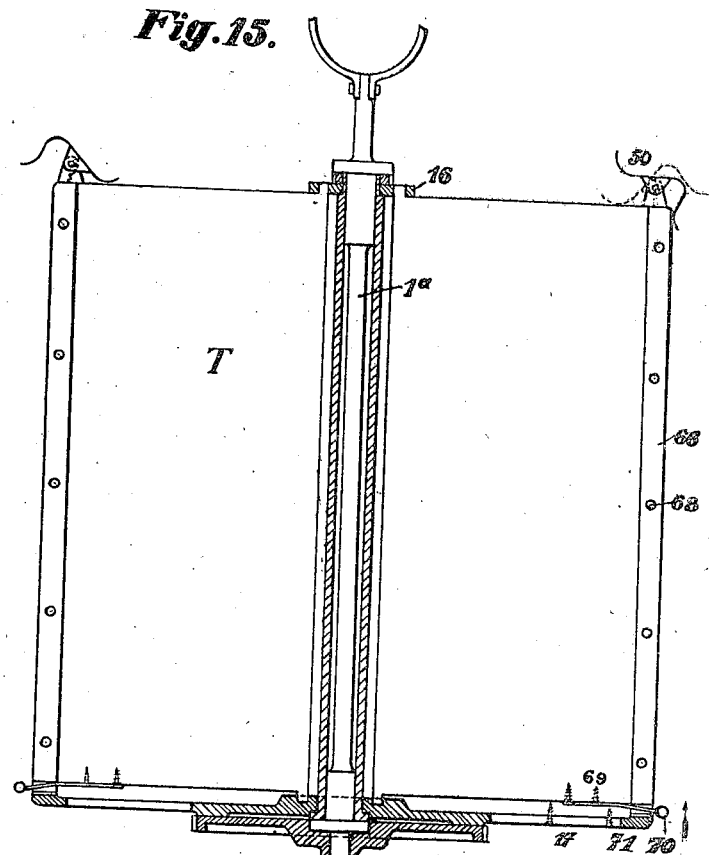
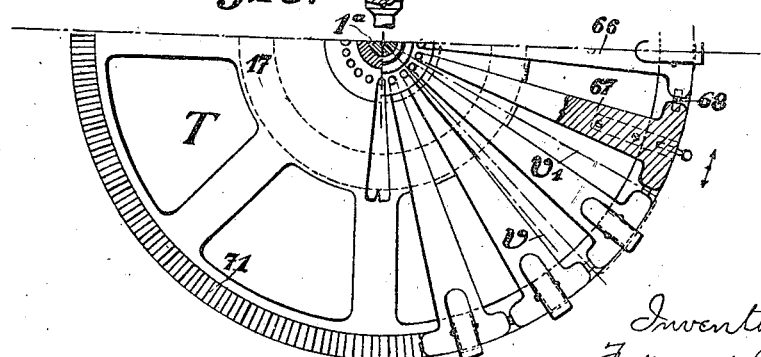

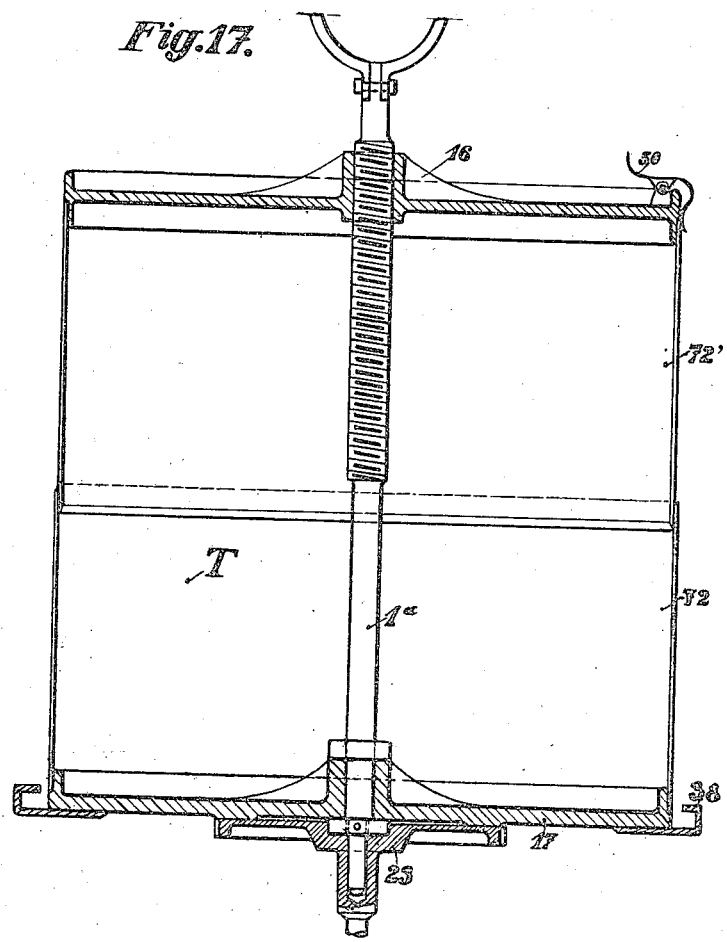

Mar. 6, 1923. 1,447,479.
F. LUDWIG.
METHOD OF AND MEANS FOR USE IN CALCULATING WAGES.
FILED FEB. 28, 1921. 11 SHEETS—SHEET 9.

Fig. 48

| Occupation | Name | Sh.i.fts | Sick fund | Wage | arrears | addi-tional wage | Sick fund | Total amount | Fines | Advance | House rent | Fuel received | Transport | cash payable |
|---|---|---|---|---|---|---|---|---|---|---|---|---|---|---|
| | | | | Wage | Gross income | | | Dollars and Cents | | | Reductions | | | |
| Blacksmith | Long Percy | 152 | 4.85 | 30.40 | .46 | 6.— | —.— | 36.86 | .38 | —.— | 2.40 | .60 | .48 | 33.— |

Inventor
Ferdinand Ludwig
By [signature]
atty.

Fig.19

| | Statement | $ | c |
|---|---|---|---|
| 55 | a $2:- | 11 | — |
| 6.5 | | 13 | — |
| 3.2 | | 6 | 40 |
| 15.2 | shifts | 30 | 40 |

Details of shifts

Summary of net income

| | | $ | c |
|---|---|---|---|
| | wage total | 30 | 40 |
| | arrears | — | 40 |
| | additional wage | 6 | — |
| | sick fund | — | — |
| | gross income | 36 | 80 |
| Deduction | fines | — | 38 |
| | advances | — | — |
| | house rent | 2 | 40 |
| | fuel received | — | 60 |
| | Transport | — | 43 |
| | Cash payable | 33 | — |

Name: Long Percy
Occupation: blacksmith

Inventor
Ferdinand Ludwig.
By [signature] Atty.

Mar. 6, 1923.　　　　　　　　　　　　　　　　　　　　1,447,479.
F. LUDWIG.
METHOD OF AND MEANS FOR USE IN CALCULATING WAGES.
FILED FEB. 28, 1921.　　　　　　　11 SHEETS—SHEET 11.

Inventor
Ferdinand Ludwig,
By [signature]
　　　Atty.

Patented Mar. 6, 1923.

1,447,479

UNITED STATES PATENT OFFICE.

FERDINAND LUDWIG, OF WITKOWITZ, CZECHOSLOVAKIA.

METHOD OF AND MEANS FOR USE IN CALCULATING WAGES.

Application filed February 28, 1921. Serial No. 448,461.

(GRANTED UNDER THE PROVISIONS OF THE ACT OF MARCH 3, 1921, 41 STAT. L., 1313.)

*To all whom it may concern:*

Be it known that I, FERDINAND LUDWIG, a citizen of the Czecho-Slovac Republic, and residing at Witkowitz, in the Czecho-Slovac Republic, have invented certain new and useful Improvements in a Method of and Means for Use in Calculating Wages, (for which applications for patents have been filed in Austria, October 3, 1918, Patent No. 84,046, dated Nov. 29, 1920; Hungary, October 12, 1918, patented March 9, 1920; Czechoslovakia, July 15, 1919, Patent No. 2932, dated September 6, 1920; and Germany, October, 1918); and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

As is well known, wages are usually related to time and it frequently happens therefore that the interval between the expiration of the period for which calculation is made and the moment of paying the workman is so short that such wages can only be made up and got ready in time by utilizing the services of every member of the office who may be available for the purpose.

Attempts to simplify the making up of wages and to effect as great a saving in the labour of writing and calculating as possible, have led to the employment of adding machines but without solving the problem in an entirely satisfactory manner. The means forming the subject of the present invention remove all defects in the present system of wage calculation whilst at the same time providing a basis for an unerring method of computation with the greatest possible saving both of time and of staff-service. The invention is based on a new principle of computation the essential feature consisting in the employment, in combination with a specially constructed display drum operatively associated with and dependent upon the adding-machine, of appropriately prepared earnings-sheets arranged around the drum corresponding to the individual operatives and to wage-book sheets which in respect of computed wages to be paid for work done are to be subsequently prepared therefrom. Each operative has his wage for each shift calculated daily on his own earning sheet so that, at the final day of the wage period, his account for earnings may be obtained. In this earnings-sheet are also entered all other extra-earnings, deductions and other items so that, when being paid, the operative may immediately ascertain from his earnings sheet the net amount due to him.

These earnings-sheets form the basis for the preparation of the wage book, which consists of individual double sheets on each of which are provided all possible headings which appear to be helpful in the labour of computation and which also occur on the earnings-sheet. But while on the latter these figures are ranged in columns one below another, the spaces for corresponding entries in the wage-book page are disposed horizontally for every operative. Every wage-book page itself constitutes a statement of the amounts under the headings of the corresponding number of earnings sheets and the sum of such amounts.

The invention thus solves the problem of establishing connection between the wage-book pages and the earnings-sheets with a view to as speedy computation as possible, by arranging beside the adding machine, which it is expedient to have driven by electricity, a display drum the operation of which is dependent on the former and on which are placed the number of earnings-sheets corresponding to the number of lines on the wage-book page devoted to the names of the operatives. If now the corresponding wage-book page be inserted in the adding machine, then the employee in charge of the latter requires only to copy off the successive headings of the earnings-sheets placed on the display drum. The exposure of these amounts on the drum is effected individually in an automatic manner and positively with the aid of devices hereinafter described.

Figure 2:
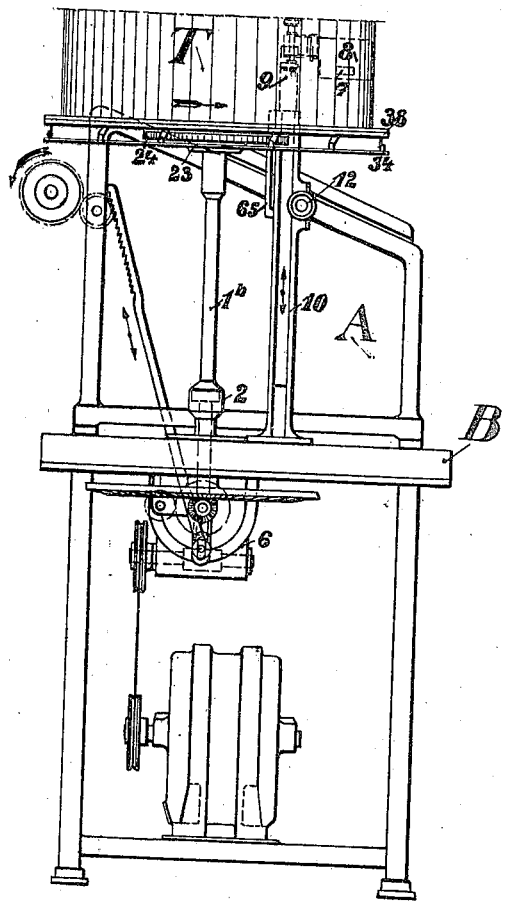
Figure 3:
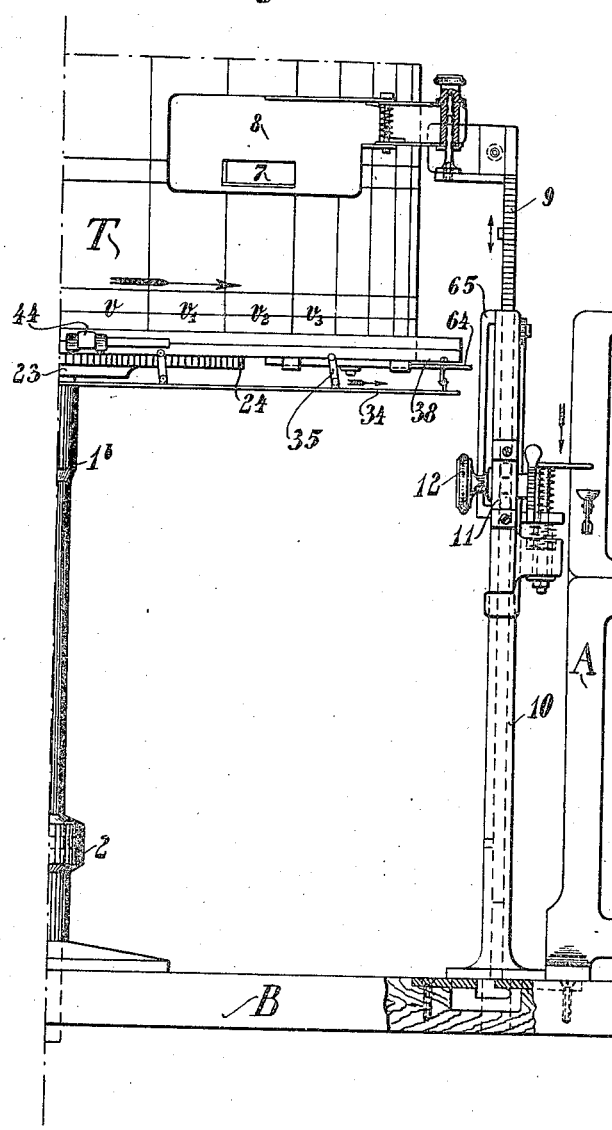
Figure 4:
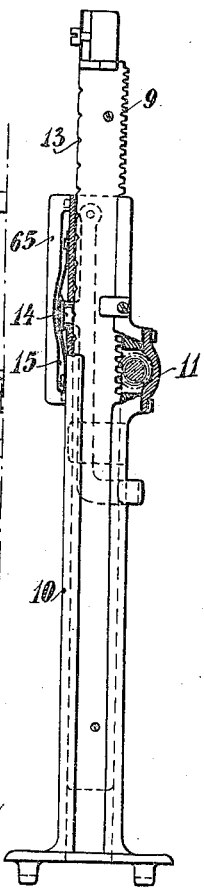
Figure 5:
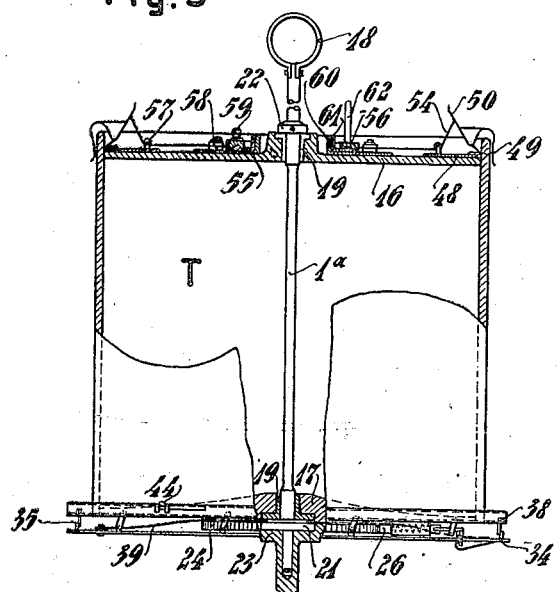
Figures 6, 7:
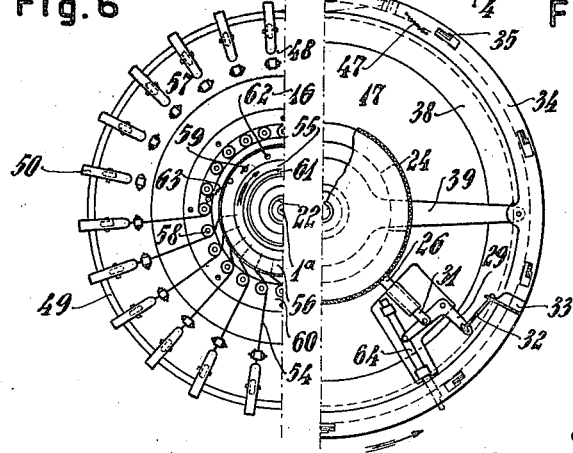
Figure 11:
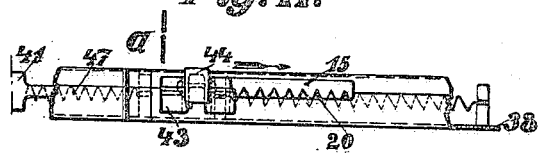
Figure 12:
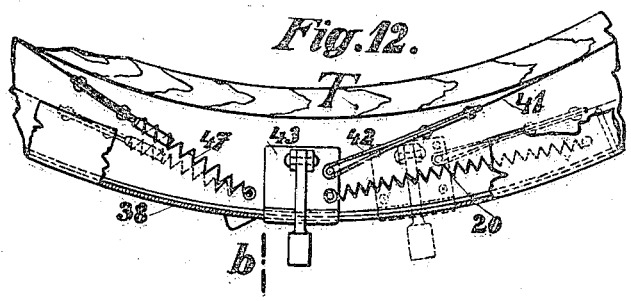

In the accompanying drawings which illustrate, by way of example, a practical constructional form of the invention, Figs. 1 and 2 are front and end elevations respectively of the apparatus complete. Figs. 3 and 4 show to a somewhat larger scale, the means serving to carry the adjustable display member, also in front and end elevation. Fig. 5 is a vertical section taken through the display drum. Figs. 6 and 7 are respectively a plan and under plan of the lower drum end. Figs. 8 and 9 represent, on a still larger scale, a vertical section and underside view of a part of the lower drum end, while Fig. 10 is a section through a part of the upper drum end together with the means for holding the upper edges of the earnings-sheets upon the drum circumference. Figs. 11, 12, 13 and 14 illustrate in side elevation plan, in section along the line $a$—$b$ through Figs. 11 and 12 and in a second position with reference to Fig. 11, the means for holding the lower edges of the earnings sheets upon the drum circumference.

Figure 20:
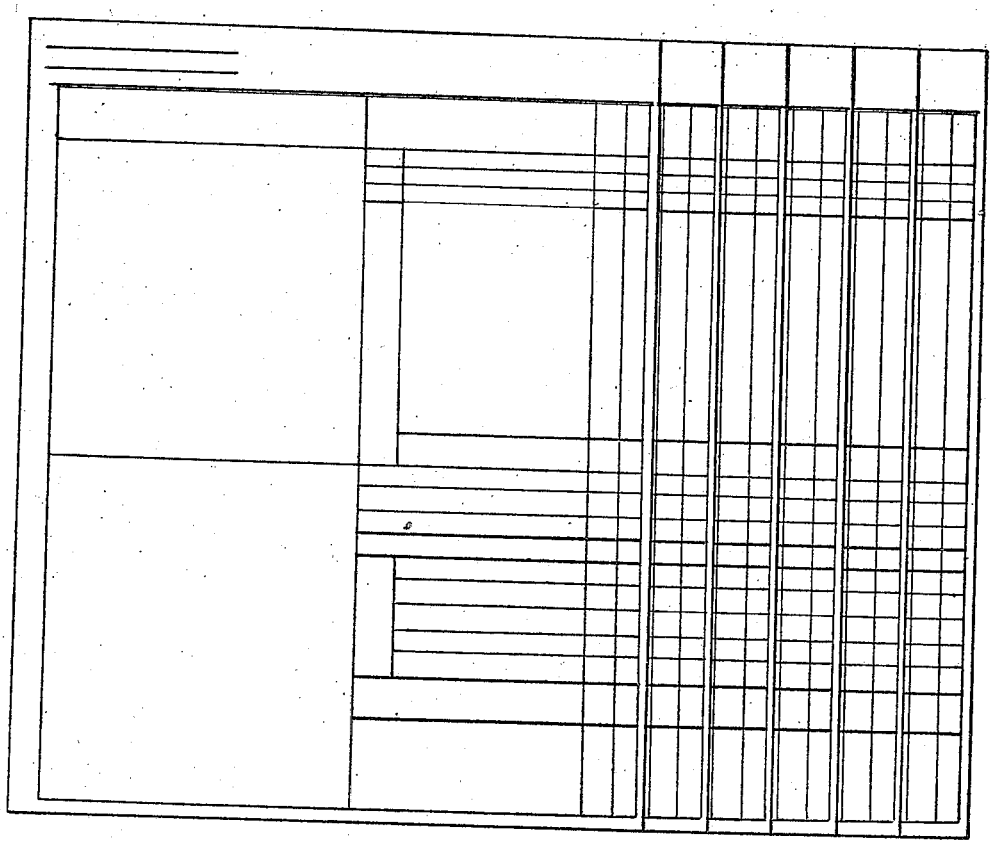

Figs. 15 and 16 show in vertical section and in plan respectively an appliance for securing folded earnings-sheets to the drum. Fig. 17 is a vertical section of a telescopically collapsible and distensible display drum serving for the reception of earnings-sheets of greater height. Fig. 18 represents the top and the first lines of a wage-book page, while Fig. 19 represents an earnings-sheet. Fig. 20 shows the manner in which the separate earnings-sheets are superposed on each other on the drum, the latter, not shown here, being supposed to be developed into a plane.

Through the display drum T (Figs. 1 and 5) passes a vertical spindle $1^a$ provided with a handle 18 and mounted in bearings 19 in both the drum ends 16 and 17 said spindle being screwed to the head 21 and prevented with the aid of the retaining ring 22, from being displaced or rotating. The lower extremity of the spindle $1^a$ projects into the socket shaped upper end 23 of a spindle $1^b$ mounted in a bearing 2 which is secured, to one side of the adding-machine A, upon the operating table B, (Fig. 1). In order to ensure a rigid attachment between the drum T and the socket part 23 of the spindle $1^b$, this socket part is constructed with a flange, by means of the toothed periphery 24 of which and bolts 26 (Figs. 5, 8 and 9) the parts become locked together. To the lower end of the spindle $1^b$ is keyed the bevel wheel 3 with which meshes a bevel wheel 5 mounted on a horizontal shaft 4. This shaft is carried by the table B (Fig. 1) and is rotated by the driving mechanism 6 of the adding machine A (Fig. 1). The gearing ratio between the adding machine and the display drum is so chosen that with every writing down of a number, the drum is simultaneously turned through a correspondingly large angle and the next number appears at the opening 7 of an index shield 8 which is secured to a rack 9 vertically adjustable in a standard 10, (Fig. 1). This standard is fitted to the table between the drum and the adding machine. By means of the rack 9, the index shield 8 may be adjusted vertically to the next row of figures of the earnings-sheets which are fastened securely side by side on the drum circumference and partially over-lapping each other. For this purpose there is fitted in the standard 10 a spur wheel 11 (Figs. 3 and 4) provided with a turning handle 12 and engaging the rack. On the back of the rack are cut notches 13, the pitch of which corresponds to the vertical distance between numbers on the display drum and with these notches engages a locking tooth 14 which is pressed by a spring against the back of the rack. In order to enable the operative to liberate the drum T from any position he may be sitting in at the adding machine, the flange of the socket part 23 is as before referred to provided with a toothed circumference 24 (Figs. 8 and 9) with which engages a toothed bolt 26, carried in a sheath 25. The bolt, which is smaller at its middle part and at its outer end 27 is fashioned as a joint member is pressed by a spring 28 against the toothed flange and is secured to a crank lever 29 which, by means of a pivot 30 is rotatable on a plate 31 screwed to the lower end 17 of the drum. The shorter arm of the crank lever 29 is connected by a rod 32 and an angle plate 33, with a ring 34, which by means of the links 35 and the bolts 36, 37 is suspended from a ring 38, having a U-shaped profile and screwed to the bottom of the drum 17. When the ring 34 is pressed against the ring 38 and thereby angularly displaced, then the crank lever 29 is brought into the dotted line position (Fig. 9) whereupon the toothed bolt 26 is withdrawn from the teeth 24 of the flange of the socket part 23; when the ring 34 is liberated, then the leaf spring 39, which is mounted on the drum end 17 and connected with the latter ring by the bolts 40, presses the ring 34 back to its original position and at the same time the spring 28 fixed on the toothed bolt 26 urges the latter again against the toothed flange so that the crank lever also returns to its initial position.

When one row of figures has been copied horizontally from the display drum and the next row is to be dealt with as is done by lowering the index shield 8 through the rack 9, then the marking of the initial position is effected by a slide 64 (Figs. 7 and 9) mounted upon the plate 31 and connected with the longer arm of the crank lever 29. On withdrawing the toothed bolt 26 this slide advances so far that, on turning of the drum, it strikes against the projecting rail 65 which is screwed to the standard 10. Searching for the beginning of the row of digits on the drum T is therefore unnecessary because the clerk in charge of the adding machine A turns the drum so far that the slide 64 strikes against the rail 65 (Figs.

3, 4, 9). As soon as this happens, and the bolt 26 is again engaged with the teeth of the flange 23, the copying may start afresh The distributing of the earnings sheets V, V₁, V₂, (Fig. 3) on the drum T is effected with the aid of the following apparatus.

To the upper drum end 16 (Fig. 10) a ring 48 is securely screwed; on the latter and on the upstanding rim, 49 of the drum are fastened brackets 51 bearing the spring mounted clasps 50. These clasps, the number of which depends on the number of sheets to be displayed, are pressed against the drum circumference by means of spiral springs 52 and their lever shaped parts 53 which are directed towards the centre of the drum are attached to a cord 54 (wire, catgut or the like). (Fig. 10). In a second flanged ring 60 fixed on the drum end 16 lies a ring traveller 55 and a clamping ring 56, between which the cords 54, which are passed over roller guides 57 and 58 revolubly mounted on the drum end, can be secured with the aid of tension screws 59. The ring traveller 55 is secured in position by a nut 61 screwed on to the upstanding flange of the ring 60.

When the two rings 55 and 56 are turned by means of the handle 62, the cords 54 become tightened and thereby the clasps 50 are withdrawn from the circumference of the drums taking up the position denoted in Fig. 10 by dotted lines. The spiral spring then similarly occupies the position denoted by the dotted lines and holds the clasp against springing back on to the drum circumference. The rings 55, 56 are, by means of the spiral spring 63 which has become tensioned by rotation and which is fastened to the clamping ring 56 and to the pivot of one of the guide rollers 58, restored to their original position.

Figure 13:
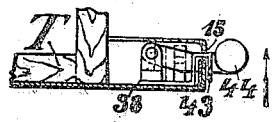
Figure 14:
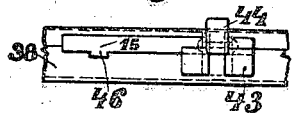

Round the drum is further arranged a steel band 41 (Figs. 7, 11 and 12) resting on the lower drum end 17 which is attached at the end 42 to the guide member 43, which latter carries a pivoted lever 44 and slides in a groove 15 of the ring 38 secured to the drum end 17 (Figs. 13 and 14). A spiral spring 20 (Figs. 7, 11 and 12) which is connected to the guide member 43 and the ring 38, tends to pull the guide member along the groove 15 (Fig. 14) whereby the steel band 41 which, at its other end is fastened to the ring 38 by a spiral spring 47, is loosened. As soon as the spring 20 is tensioned, necessitating the guide member 43 being pushed back along the groove 15 by means of the lever 44, the tensioning of the steel band takes place which is thus pulled tight round the drum. To hold fast the taut steel band the lever 44 is then latched into a notch 46 (Fig. 14) in the lower edge of the groove 15 of ring 38. If it be desired that the earnings sheets V, V₁, V₂ which are spread out or spaced in the above manner on the drum, should be made fast, one upon the other, to the circumference of the drum, then the clasps are brought into the detached position (shown in dotted lines in Fig. 10) and the steel band fitted near the drum bottom, is loosened. The earnings sheets are put in singly and the clasps one by one, pressed down with the hand so that the upper edge of the sheets is held fast. Thereupon the steel band is tightened by means of the arrangement just specified, so that in this way the earnings sheets are secured at their lower edge also.

When columns of figures, further removed from the side edges of the earnings sheets, have to be copied, then larger portions of the adjacent sheets must remain uncovered and only a few such sheets can be distributed over one and the same drum. To meet this drawback, the drum T may be constituted as shown in Figs. 15 and 16. The drum here consists of a more or less broad stationary segment 66 and a series of segments 67 movable towards the former, the breadth of the movable segments corresponding to that of a heading. These segments, which may be moved to and fro, as well as the stationary segment carry at their edges adapted to come in contact with each other, small rubber or spring buffers 68 and may be fixed in separated or engaging position, by a tooth 70 attached to a spring 69 which engages into a toothed rim 71 on the lower end of the drum. By disengaging the tooth by hand, the movable segments 67 may be moved to and fro.

The earnings-sheets to be fed on are folded and inserted in such a way that only the column of figures to be copied is exposed on the circumferential face of the respective segments while the portion of the sheet adjacent to this column on either side are bent inwards and disposed radially towards the drum axis. In this position the sheets are secured by rotating the movable segments against the stationary one and making use of the pressure exerted through their buffers 68. The upper sheet edges are as before secured by the spring clasps 50 while any further fastening at the lower end of the drum may be dispensed with. For earnings sheets with long columns of figures and therefore of greater length vertically, it is expedient, in order to avoid long indicating drums, to construct the latter of cylindrical component parts 72, 72¹ (Fig. 17) which can be, telescope fashion, inserted into each other. It is advantageous to effect and control the adjustment of these cylindrical segments by means of the drum spindle 1ᵃ, which is constructed as a screw spindle extending through the central nut-like boss of the upper drum end; when rotated, as is done by hand, it raises or lowers the drum end 16 and the part of the drum cover attached to it, whereby the drum itself is lengthened or shortened.

What I claim is:—

1. A copy holder comprising a rotatable shaft, a drum thereon, manually operated clips at the top of said drum to clamp sheets thereto and a tensionable band at the bottom of said drum to clamp the lower edges of copy sheets to said drum.

2. A copy holder comprising a rotatable drum composed of two telescoping parts and means to adjust the height of one of said parts with respect to the other.

3. A copy holder comprising a copy holding drum, a spindle therefore, a toothed wheel on said spindle, a bolt on the drum slidable into engagement with said wheel, a bell-crank lever connected to said bolt, a ring suspended from said drum and means to connect said lever and ring, whereby the movement of said ring with respect to the drum will disengage said bolt.

4. A copy holder comprising a copy holding drum, a spindle therefore, a toothed wheel on said spindle, a bolt on the drum slidable into engagement with said wheel, a bell-crank lever connected to said bolt, a ring suspended from said drum, means to connect said lever and ring whereby the movement of said ring with respect to the drum will disengage said bolt, a stop near the periphery of said drum, and a slide connected to said bell-crank lever and projected into the path of said stop when said bolt is retracted.

5. A copy holder comprising a rotatable copyholding drum, a series of individually operable spring clips on the upper end of the drum to hold the upper edges of sheets on its periphery, and separate means to simultaneously operate said clips.

6. A copy holder comprising a rotatable copyholding drum, a ring on the bottom thereof, a flexible band around the drum, a spring connected to one end of said band and a slide connected to the other end of said band adjacent said drum, and latching means to latch said slide to tension said spring and band against the lower edges of sheets on the drum.

In testimony that I claim the foregoing as my invention, I have signed my name.

FERDINAND LUDWIG.

Witnesses:
STEPHEN K. OPECKY,
RUDOLPH LOWURIS.